July 16, 1968   A. J. IOZZI ET AL   3,392,752
DEVICE FOR MIXING A PLURALITY OF GASES AND FOR VARYING
THE RELATIVE PROPORTION OF THE GASES
Filed March 14, 1966   2 Sheets-Sheet 1
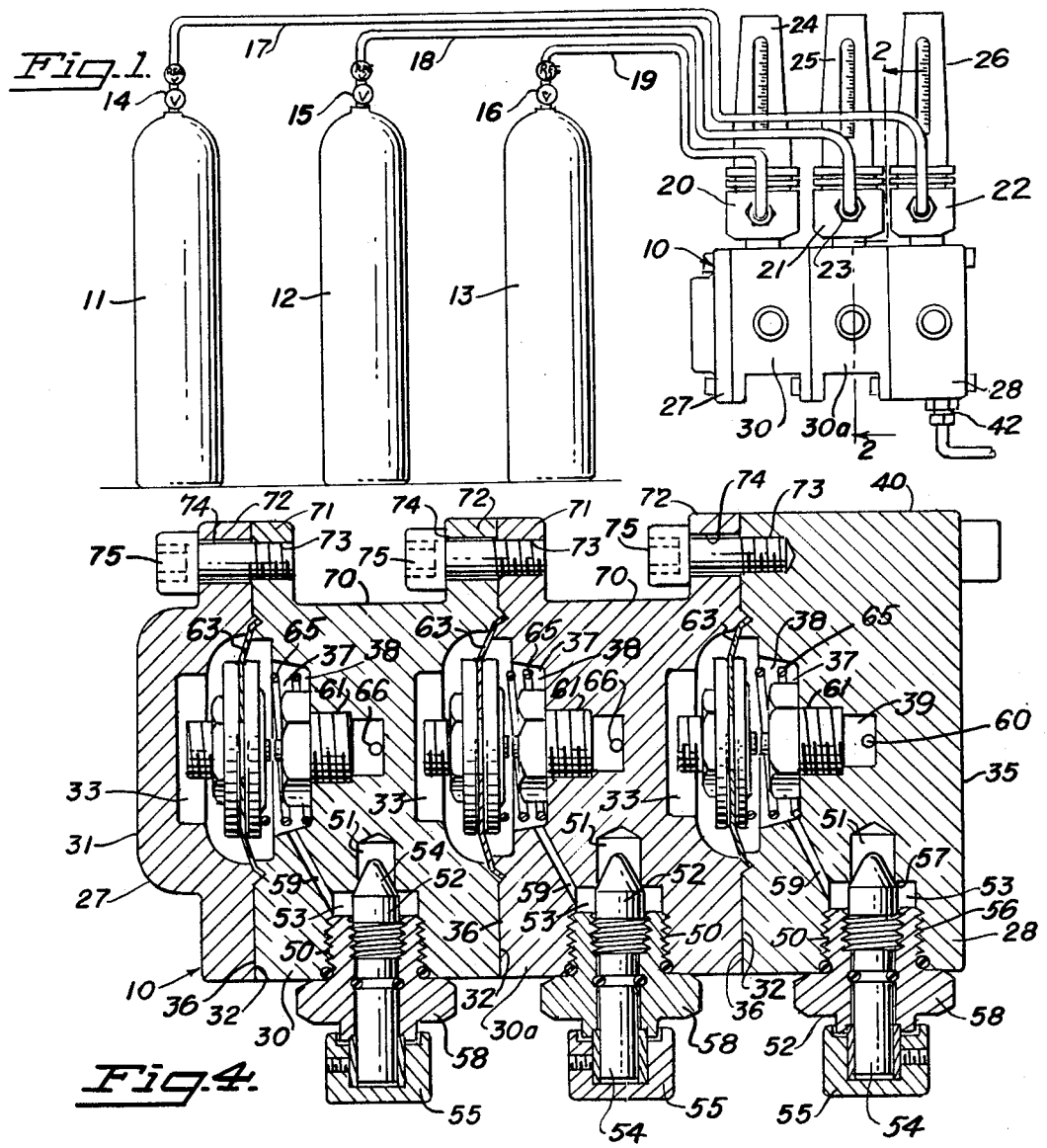
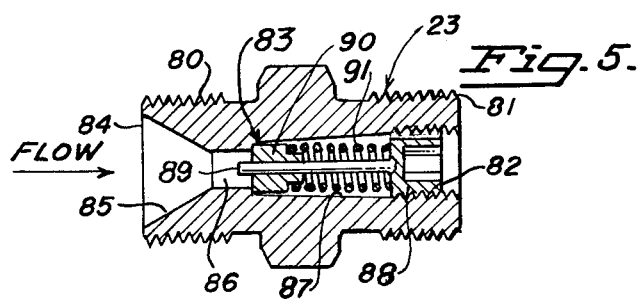
INVENTORS
ANTHONY J. IOZZI
RENE A. ZAKHOUR
BY
Owen, Wickersham & Erickson
ATTORNEYS

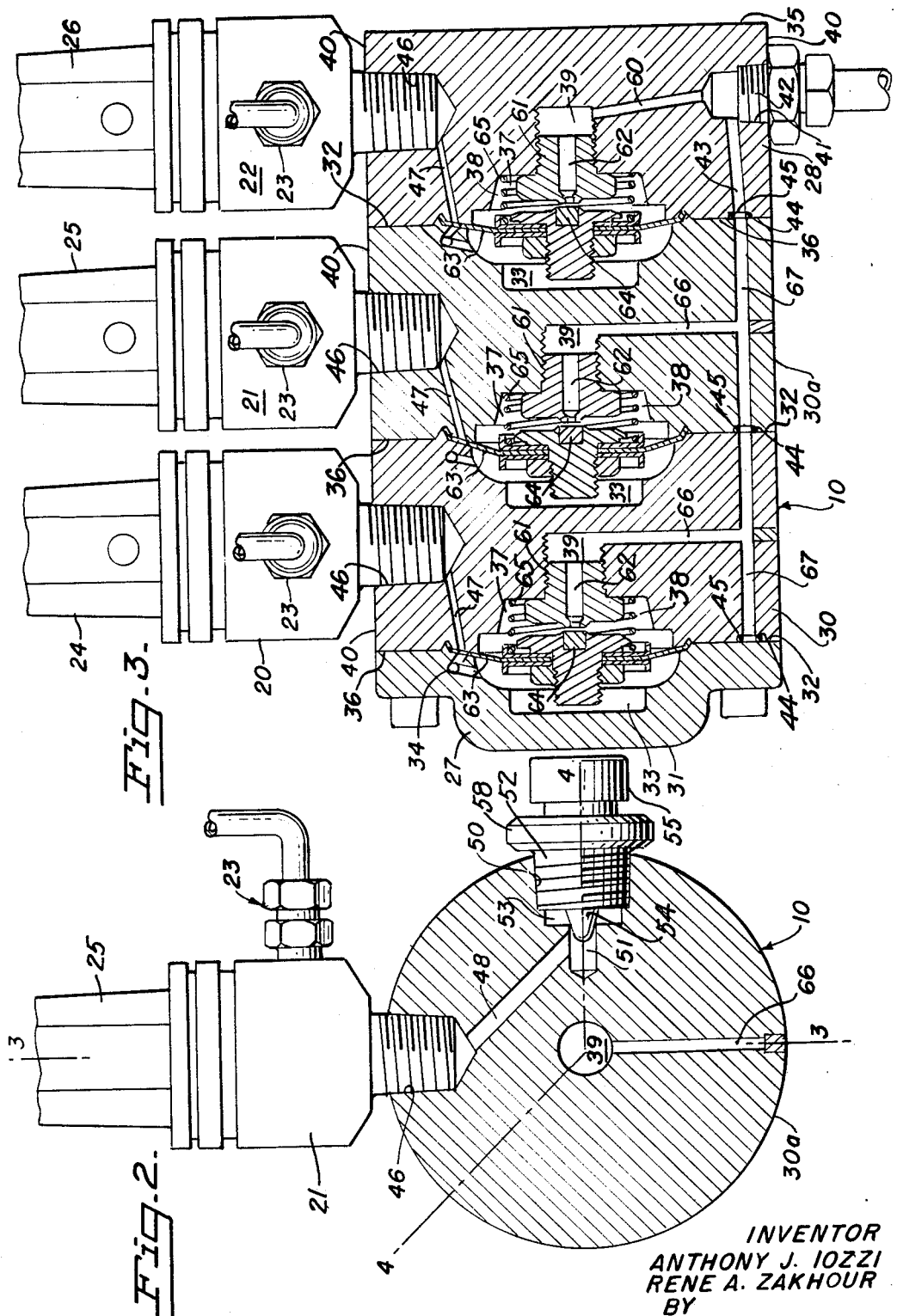

United States Patent Office 3,392,752
Patented July 16, 1968

3,392,752
DEVICE FOR MIXING A PLURALITY OF GASES AND FOR VARYING THE RELATIVE PROPORTION OF THE GASES
Anthony J. Iozzi, Moraga, and Rene A. Zakhour, San Francisco, Calif., assignors to Veriflo Corporation, a corporation of California
Filed Mar. 14, 1966, Ser. No. 534,211
10 Claims. (Cl. 137—501)

This invention relates to a device for mixing a plurality of gases and for varying the relative proportion of the gases and for maintaining any desired proportion in the face of changes in conditions downstream from the mixing device, such as pressure and temperature changes resulting in a change of downstream restriction.

The device is useful in many circumstances where gases are to be mixed. For example, in Heliarc welding, the gas shield around the electric welding operation is usually provided by a critically proportioned mixture of two, three or more different gases. Unfortunately, the shielding conditions do not remain constant, so that the proportions must be changed. Hence, supplying the user with premixed gases is not a completely desirable solution. For one thing, premixed gases are expensive, costing about twice as much as the gases obtained independently; also, when there is a temperature change, the gas mixture tends to stratify, resulting in a deficiency in one or more gases or an excess in other gases relative to the total volume, thereby causing a change in the finished product; often the addition of one gas or another changes the temperature conditions, requiring another change in the mix, and therefore it becomes very difficult to obtain a proper adjustment and hence consistent performance of the finished product. Furthermore, when attempts have been made to supply the gases separately, there have been difficulties in mixing them and particularly in keeping the mixture in the desired proportion, once there has been a change in the pressure conditions downstream. For example, if somebody steps on the outlet hose or a truck drives over it, or if it gets pinched or kinked, or if the distance to the work is increased or decreased, requiring an increase or decrease in hose length, this has changed the proportions at the gas shielding head and has made welding difficult.

Another important use of this invention is in hospitals, where, for example in anesthesia, several gases are mixed. The problem which arises here arises also to some extent in Heliarc welding, and that is that the number of gases to be mixed may (and often does) change. In Heliarc welding, the gas mixture tends to vary from two to four gases, while in medical applications it varies from two to a dozen different gases, all to be mixed with each other in critical proportions. Here again it is important for downstream conditions not to affect the proportions of the mix; it is also important to obtain the same proportions at an indicated value.

The present invention enables the mixing of any number of separate gases in any desired proportions, enables variation of the flow of each, and when any chosen proportion is selected, maintains that proportion even though downstream conditions change quite drastically. The flow of one gas may be varied without effecting a change in flow in any of the other gases. In fact it is possible to shut off any one gas or any combination of gases without the flow of any of the other gases involved.

A very important feature of the invention is that the unit is made in modules. There are a pair of end body members and one or more intermediate body members. The two end members and one intermediate member are sufficient for mixing two gases. For mixing three or more gases, an additional intermediate body member is added for each additional gas to be mixed. The addition can go on to large numbers of gases, the unit being adapted simply by disconnecting any two body members and adding as many intermediate body members as are necessary in between. Moreover, once such an assembly has been built up, it is unnecessary to take it apart when using a smaller number of gases, for shutoff valves in each intermediate body member enable its gas to be taken out of consideration without interfering with any of the other gases or with the accuracy of the mix. Thus, it is easy to add and subtract gases. Back pressure does not affect the flow, another very important feature.

Another difficulty obtained when mixing gases has been that on the inlet side of the mixing unit a shock front has been created by a rush of gas at the beginning of flow, and the lightest gas has tended to flow in excess of its set proportions, requiring other gases to catch up. In Heliarc welding this has led to the practice of not beginning the weld instantly but holding the welding head away from the workpiece for a short time, causing a more critical start of the welding until the proportions were finally stabilized. With the present invention, this becomes unnecessary, and the weld can be started at once because there is no such initial distortion. Instead, the gases increase evenly over a short time period, to build up to the complete flow rate, all in proportion. This is obtained by means of an adapter fitting which is used for each gas and is attached to the intermediate or end body member to which that gas flows. The demand that increases the pressure drop across a plug in this adapted fitting moves the plug to compensate for the flow, so that there is no surge while there is an increase at a practically laminar flow proportion into its respective body member.

Other objects and advantages of the invention will appear from the following description of a preferred embodiment thereof.

In the drawings:

FIG. 1 is a view in side elevation, partly diagrammatic, of an arrangement for mixing three different compressed gases employing a mixing device embodying the principles of the invention.

FIG. 2 is a view in section taken along the line 2—2 in FIG. 1.

FIG. 3 is a view in section taken along the line 3—3 in FIG. 2.

FIG. 4 is a view in section taken along the line 4—4 in FIG. 2.

FIG. 5 is a view in section on an enlarged scale of the inlet member of FIG. 2.

A mixing device 10 of this invention is used in conjunction with a plurality of gas sources such as cylinders 11, 12, and 13, each having its own regulator 14, 15, or 16. Each regulator is preferably set at the same pressure to enable accurate proportioning, a typical pressure being 50 p.s.i.g. Hoses 17, 18, and 19 lead from the regulators 14, 15, and 16 to the mixer 10 and are installed on respective inlet fittings 20, 21, and 22, each having an inlet adapter 23 embodying the principles of this invention and being provided with respective flow gauges 24, 25, and 26 or other suitable gauges for indicating the flow rate of each gas when it is flowing through the mixing device 10.

The device 10 comprises a first end body member 27, a second end body member 28, and at least one and often a plurality of intermediate body members 30, 30a, etc. These members are all secured together to make the mixing device 10, but the mixing device 10 can be taken apart at any point in the juncture to insert an additional intermediate member or to remove one, should that be desirable.

The first body member 27 has an imperforate outer face 31, and the body member 27 and each body member 30, 30a, etc. have an inner face 32 provided with a central axial recess 33 and an inlet passage 34 which leads from the face 32 into the recess 33.

The second end body member 28 has an imperforate outer face 35, and it and each body member 30, 30a, etc. have an inner face 36 in which is provided a second central recess 37 extending along the axis and stepped to provide an outer portion 38 and an inner portion 39. The body member 28 also has a side wall 40 provided with a recess 41 in which may be threaded an outlet fitting 42. An outlet passage 43 leads into the recess 41 and extends axially, nearly parallel to but separated from the recess 37 and leads to the face 36 where it is surrounded by a recess 44 adapted to receive a sealing gasket 45 of suitable material compatible with the gases being used.

Each body member 28, 30, 30a also has in its side wall 40 an inlet recess 46 adapted to receive the flow gauges 24, 25, 26 and an inlet passage 47 leads from the inlet recess 46 to the face 36, where it can be aligned with the passage 34 on the first end body member 27 or one like it. Also, a passage 48 leads from the recess 46 to the inner portion 51 of a stepped valve recess 50, in which is a flow control valve 52 dividing the inner portion 51 from the outer portion 53. The valve 52 serves to control the flow from the inner portion 51 to the portion 53, and it has a movable valve stem 54 and a control handle 55 by which the stem 54 can be moved, so that its sealing surface 56 abuts or is moved away from the seating edge 57 to provide cutoff or any size passage in between the inner and outer portions 51 and 53. The movable stem 54 is threaded into a valve body member 58 which itself is threaded into the valve recess 50. As stated, the passage from the inlet 22 leads to the inner portion 51; another passage 59 leads from the outer portion 53 to the outer portion 38 of the central recess 37.

The central recess 37 has a passage 60 leading from its inner portion 39 to the outlet recess 41. The inner portion 39 and outer portion 38 are separated by a valve seat member 61 threaded into the inner portion 39 and having a central axial recess 62 which is preferably small at the end facing the outer portion 38. When the valve members 27, 28, 30, 30a, etc. are assembled, they secure diaphragms 63 between each pair, which divides a recess 33 from a recess 37 and carries with it a valve closure member 64 which moves against or away from the valve seat member 61. A spring 65 is provided to enable a preloading of the diaphragm 63 to the normally open position, which otherwise is operated by gas pressure.

The intermediate body members 30, 30a, etc. are all identical and comprise the noted features of the two end body members 27 and 28. They do not have any imperforate faces, but they do have first and second faces 32 and 36 and the side wall 40, and the recesses 33, 37, and 50, with passages 34, 47, 48, and 59. Each intermediate body member 30, 30a, etc. has an outlet passage 66 which differs from the passage 60 of the end body member 28 only in that there is no outlet recess 41 and that the passage 66 leads to an axially extending recess 67 which goes centrally completely through between the end faces.

Each body member 28, 30, and 30a is also provided with scooped out exterior recesses 70 in between end portions 71 and 72; through the end portions 71 are provided threaded bolt openings 73, while unthreaded aligned openings 74 are provided in the portion 72. Bolts 75 are inserted from the portions 72 and tightened into the openings 73, the recesses 70 giving access to the head of the screw by, for example, an Allen-head wrench or external hexagonal socket.

Assembly is easy and can be done in the field. For each of the second end body members 28 and each intermediate body member 30, 30a, one diaphragm 63, preferably made from tetrafluoroethylene or similar suitable material, is provided. Each of the body members comes with its parts preassembled, including the flow control valve 52 and flowmeter 24, 25, or 26, and the regulating seat 60, and the diaphragm 63 and closure member 64 are assembled together. The seats may be of neoprene, Viton, or other suitable material.

In operation, the diaphragm assembly 63 is held away from the nozzle seat 61 by virtue of the spring 65. Therefore, the valve is, in essence, in the normally open position without any fluid introduced to it. The gas to be mixed flows from the cylinder 11, 12, or 13 through the valve and regulator via hose 17, 18, or 19 to the inlet fitting 23 and through the flowmeter 24, 25, or 26. The fluid leaves the flowmeter and enters the canal 47, flows across the diaphragm through the canal 34 and exerts a force on the diaphragm 63 causing it to deflect toward the nozzle 61 and thus effect a seal. To meter the gas being mixed, the valve handle 55 is turned counterclockwise to lift the stem 54 away from the seating surface 57 and the gas flows from the inlet of the flowmeter 25 via the canal 46 into the chamber 53. The gas then flows from the chamber 53 via the passage 59 to the chambers 38 and 37. As the force of the gas in the chambers 38 and 37 tends to equal the force created by the pressure of the fluid from the chamber 33, the seal between the diaphragm 63 and the seat 64 and the nozzle 61 is broken and the mixed gas flows from the chambers 37 and 38 through the canal 62 into the void 39 via the passage 66 into the passage 67 and thence through the fitting 42 to the work. Any restriction in the downstream side of the mixer causes an increased pressure on the outlet side, and as a result forces the diaphragm 63 away from the nozzle 61, creating a larger orifice and thus compensating for the restriction. Any decay in restriction downstream causes the pressure in the chamber 33 to force the diaphragm 63 closer to the nozzle 61, thus decreasing the orifice and compensating for the decay in downstream restriction.

One further feature remains to be described—the inlet fitting 23 which prevents sudden surges at the start of operation and maintains steady conditions during operation. This inlet adapter 23 is provided with two exteriorly threaded ends 80 and 81 and one interiorly threaded end 82 with a central passage 83 through it. At a non-interiorly-threaded end 84, the central passage 83 is at first conical at 85, leading into a short cylindrical portion 86, which is followed by a long tapered or frustoconical portion 87 which gradually widens out to the interiorly threaded portion 82. Into the interiorly threaded portion 82 is inserted a stationary member 88 having a stem 89 around which is fitted a slidable cylindrical plug member 90. The plug member 90 has the same diameter as the narrowest part of the tapered chamber 87 and it is normally urged away from the stationary plug 88 by a spring 91. When the gas is let in, the plug 90 is moved axially toward the stationary member 88 and as it does so, opens up the tapered chamber 87 to give a laminar or gradual increase in flow, and thereby provides a gradual decrease in pressure drop and a gradual increase in flow, thus eliminating any surges, which might otherwise result from a "flow" to a "no flow" condition across a flat seat or orifice.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

We claim:

1. A device for mixing a plurality of gases, each supplied by a gas source at regulated pressure, and for varying the relative proportions of the gases and for maintaining any desired proportions in the face of changes in downstream conditions, including in combination:

a first end body member having an imperforate outer wall and an inner face having a first recess, a second end body member having an imperforate outer face and an inner face having a second recess having an outer portion and an inner portion, and having a side wall with an outlet opening connected to said inner portion, and an outlet passage extending from said inner face to said outlet opening, at least one intermediate body member having first and second faces and a side wall, each said first face having therein a said first recess substantially identical to that of said first end body member, each said second face having therein a said second recess substantially identical to that of said second end body member, and having outlet passage means extending axially between said first and second faces and aligned with said outlet passage of said second end body member and connected by side passage means to its said inner portion of said second recess, said body members being joined end to end with each said first recess being aligned with a said second recess, a diaphragm sealed between each two successive said body members and separating a said first recess from a said second recess, with said second recess containing spring means for exerting pressure on said diaphragm and each said diaphragm having means for separating and connecting said outer portion from said inner portion according to the position of said diaphragm, each of said intermediate body members and said second end body member having a control valve recess having an outer portion connected to said outer portion of said second recess and an inner portion and also having a gas inlet means for connection to said source, and means for connecting said gas inlet means to both the said first recess of the adjacent body member and to the inner portion of said control valve recess, a flow control valve in each said valve recess, separating the inner and outer portions thereof when closed and connecting them when opened and then serving to provide any of a wide variety of flow rates therethrough, and fastening means holding said body members together.

2. The device of claim 1 wherein said fastening means comprises axially extending bolts joining each body member to its immediately adjacent said body member only, so that between any two said body members additional said intermediate body members can be added to handle any desired number of gases to be mixed by modular addition.

3. The device of claim 1 wherein each said gas inlet means is provided with a surge-preventing valve having a frustoconical passage in which is slidably mounted a normally closed spring urged cylindrical closure member.

4. A device for mixing a plurality of gases, each supplied by a gas source at regulated pressure, and for varying the relative proportions of the gases and for maintaining any desired proportions in the face of changes in downstream conditions, including in combination:

a first end body member having an imperforate outer end face and side wall and an inner face with a first recess and a first inlet passage to said first recess, a second end body member having an imperforate outer end face and an inner face having a second recess in line with said first recess and stepped to provide an outer portion and an inner portion, and having a side wall with outlet means connected by a first outlet passage to said inner portion and having a second outlet passage extending from said inner face to said outlet means, at least one intermediate body member having first and second faces and a side wall, each said first face having therein a said first recess and a said first inlet passage substantially identical to those of said first end body member, each said second face having therein a said second recess substantially identical to that of said second end body member, and having a third outlet passage extending between said first and second faces and aligned with said second outlet passage of said second end body member, said body members being joined end to end with each said first recess being aligned with a said second recess, a diaphragm sealed between each two successive said body members to separate each said first recess from a said second recess, each said second recess containing spring means for exerting pressure on said diaphragm, a stationary valve member separating said outer portion from said inner portion and having a central passage therethrough leading from said outer portion to said inner portion, and seat means moved by said diaphragm for opening and closing said central passage and controlling the flow of gas therethrough, each of said body members that has a said second recess having a passage leading from its said inner portion to said outlet passage, and also having a gas inlet in said side wall for connection to a said source, a second inlet passage leading from said gas inlet to the face having the said second recess and connected there with a said first inlet passage, and also having a stepped valve recess having an outer portion connected to said outer portion of said second recess and an inner portion connected to said second inlet passage, a flow control valve in each said valve recess, separating the inner and outer portions thereof when closed and connecting them when opened by a variable size opening for obtaining variable flow, and fastening means holding said body members together.

5. The device of claim 4 wherein each said body member is provided with lug means, those of each adjacent pair facing each other, said fastening means joining each adjacent pair of body members at said lug means and doing so separately so that said intermediate body members, treated as modular units, may be added and subtracted at will to accommodate for fewer gases.

6. The device of claim 4 wherein said second and third outlet passages are provided with sealing O-rings at each juncture with an adjacent body member for preventing leakage at each said juncture.

7. The device of claim 4 wherein said flow control valve comprises a valve body member threaded into said housing and a valve stem having a conical seat end and threaded adjustably into said valve body member.

8. A device for mixing a plurality of gases, each supplied by a gas source at regulated pressure, and for varying the relative proportions of the gases and for maintaining any desired proportions in the face of changes in downstream conditions, including in combination:

a first end body member having an imperforate outer face and an inner face and a first central recess extending in axially from said inner face, said inner face having a first inlet passage to said first recess, a second end body member having an imperforate outer face and an inner face having a second central recess extending along the axis of said second body member, and stepped to provide an outer portion and an inner portion, and having a side wall with an outlet means connected by a first outlet passage to said inner portion and having a second outlet passage extending axially from said inner face to said outlet means, generally parallel to and separated from said recess, at least one intermediate body member each having first and second faces and a side wall, each said first face having therein a said first central recess and a said first inlet passage identical to that of said first end body member, each said second face having therein a said second central recess identical to that of said second end body member, and having a third outlet passage extending axially between said first and second faces parallel to and separated from said recess, and aligned with said second outlet passage of said second end body member, and a fourth outlet passage connecting said third outlet passage to said inner portion of its said second recess, said body members being joined end to end with each said first recess being aligned with a said second recess, a diaphragm separating each said first recess from a said second recess and sealed between two said body members, each said second recess containing spring means for exerting pressure on said diaphragm and a stationary valve member separating said outer portion from said inner portion and having a central passage therethrough leading from said outer portion to said inner portion, seat means mounted on and movable with said diaphragm for closing off said central passage and opening it to pass a controlled flow of gas, each of said body members that has a said second recess having a gas inlet in said side wall for connection to a said source, a second inlet passage leading from said gas inlet to the face having the said second recess and connected there with a said first inlet passage, and also having a stepped control valve recess having an outer portion connected to said outer portion of said second recess and an inner portion connected to said second inlet passage, a flow control valve in each said valve recess, separating the inner and outer portions thereof when closed and connecting them when opened by a variable size opening for obtaining variable flow, and fastening means holding said body members together.

9. The device of claim 8, wherein each said intermediate body member has a plurality of recesses in its side walls separated by non-recessed portions and lug means on opposite ends of each said recess comprising bolt openings, said fastening means comprising bolts, said end body members also having bolt openings, and said bolts joining each successive pair of body members, being inserted chiefly by means of said recesses, whereby any two successive body members can be disconnected by removal of said bolts and any desired number of additional intermediate body members inserted in between them, for modular accommodation of additional sources of gas.

10. The device of claim 8 wherein each gas inlet has an associated inlet fitting having a frustoconical passage with a shoulder at one end and a cylindrical closure member in said frustoconical passage, and spring means urging said closure member against said shoulder, for prevention of sudden surges of pressure from the gas sources.

References Cited

UNITED STATES PATENTS

| | | | |
|---|---|---|---|
| 2,742,764 | 4/1956 | St. Clair | 137—501 XR |
| 2,803,264 | 8/1957 | Griswold | 137—501 |

M. CARY NELSON, *Primary Examiner.*

R. J. MILLER, *Assistant Examiner.*